United States Patent
Loureiro et al.

(10) Patent No.: US 7,311,859 B1
(45) Date of Patent: Dec. 25, 2007

(54) METHOD TO PRODUCE NANOCRYSTALLINE POWDERS OF OXIDE-BASED PHOSPHORS FOR LIGHTING APPLICATIONS

(75) Inventors: Sergio Paulo Martins Loureiro, Saratoga Springs, NY (US); Anant Achyut Setlur, Niskayuna, NY (US); Darryl Stephen Williams, Clifton Park, NY (US); Mohan Manoharan, Niskayuna, NY (US); Alok Mani Srivastava, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 259 days.

(21) Appl. No.: 10/991,980

(22) Filed: Nov. 17, 2004

(51) Int. Cl.
C09K 11/08 (2006.01)
(52) U.S. Cl. ............... 252/301.4 R; 252/301.4 F; 252/301.4 S; 252/301.4 P; 252/301.4 H; 252/301.5; 252/301.6 R; 252/301.6 S; 252/301.6 P; 252/301.6 F
(58) Field of Classification Search ........... 252/301.4 R–301.4 H
See application file for complete search history.

(56) References Cited

U.S. PATENT DOCUMENTS

| | | | |
|---|---|---|---|
| 5,552,082 A * | 9/1996 | Srivastava et al. | .... 252/301.4 R |
| 5,571,451 A * | 11/1996 | Srivastava et al. | .... 252/301.4 R |
| 5,637,258 A | 6/1997 | Goldburt et al. | ......... 252/301.4 |
| 5,770,172 A * | 6/1998 | Linehan et al. | .......... 423/561.1 |
| 6,036,886 A * | 3/2000 | Chhabra et al. | ....... 252/301.4 R |
| 6,482,387 B1 | 11/2002 | Gülgün et al. | |
| 6,576,156 B1 | 6/2003 | Ratna et al. | ............. 252/301.4 |
| 6,613,248 B2 | 9/2003 | Setlur et al. | |
| 6,734,465 B1 | 5/2004 | Taskar et al. | |
| 6,774,556 B2 | 8/2004 | Srivastava et al. | |
| 6,982,046 B2 * | 1/2006 | Srivastava et al. | .... 252/301.4 R |
| 2004/0191518 A1 * | 9/2004 | Naito et al. | ................ 428/407 |

FOREIGN PATENT DOCUMENTS

WO 0036050 A 6/2000

OTHER PUBLICATIONS

Chemical abstract citation 134:166301: Li et al, "Application of water-in-oil microemulsions in the preparation of nanoparticles", 2000.*
European Search Report Feb. 24, 2006.
Am Srivastava et al., "*Luminescence of $Pr^{3+}$ in $SrAl_{12}O_{19}$: Observation of Two Photon Luminescence in Oxide Lattice*", Elsevier ScienceB.B., Journal of Luminescence, vol. 71, pp. 285-290, 1997.
SK Hait et al., "*Gemini Surfactants: A Distinct Class of Self-Assembling Molecules*", Current Science, vol. 82, No. 9, May 10, 2002.

* cited by examiner

Primary Examiner—C. Melissa Koslow
(74) Attorney, Agent, or Firm—Jason K. Klindtworth; Jean K. Testa

(57) ABSTRACT

Some embodiments of the present invention are directed toward nanocrystalline oxide-based phosphor materials, and methods for making same. Typically, such methods comprise a steric entrapment route for converting precursors into such phosphor material. In some embodiments, the nanocrystalline oxide-based phosphor materials are quantum splitting phosphors. In some or other embodiments, such nanocrystalline oxide based phosphor materials provide reduced scattering, leading to greater efficiency, when used in lighting applications.

40 Claims, 5 Drawing Sheets

METHOD TO PRODUCE NANOCRYSTALLINE POWDERS OF OXIDE-BASED PHOSPHORS FOR LIGHTING APPLICATIONS

FEDERALLY SPONSORED RESEARCH

The present invention was made with support from the Department of Energy, Contract Number DE-FC26.03NT41945.

TECHNICAL FIELD

The present invention relates generally to methods for preparing oxide-based phosphor materials, and more specifically to templated synthesis methods for preparing nanometer-scale oxide-based phosphor materials.

BACKGROUND INFORMATION

A luminescent material absorbs radiation from one region of the electromagnetic (EM) spectrum and emits radiation in another region of the electromagnetic spectrum, the emission generally being lower in energy than the absorption (i.e., Stokes shifted). A luminescent material in powder form is commonly called a phosphor, while a luminescent material in the form of a transparent solid body is commonly called a scintillator.

Two broad classes of luminescent materials are generally recognized. These are self-activated luminescent materials and impurity-activated luminescent materials.

A self-activated luminescent material is one in which the pure crystalline host material, upon absorption of a high energy photon, elevates electrons to an excited state from which they return to a lower energy state by emitting a photon. Self-activated luminescent materials normally have a broad spectrum emission pattern because of the relatively wide range of energies that the electron may have in either the excited or the lower energy states. Thus, any given excited electron may emit a fairly wide range of energy during its transition from its excited state to its lower energy state, depending on the particular energies it has before and after its emissive transition.

An impurity-activated luminescent material is normally one in which a non-luminescent host material has been modified by inclusion of an activator species (i.e., dopant), which is typically present in the host material in a relatively low concentration, such as in the range from about 200 parts per million (ppm) to 1 part per thousand. However, some materials require several mole or atomic percent of activator ions for optimized light output. With an impurity-activated luminescent material, the activator ions may either absorb the incident photons directly, or the lattice may absorb the incident photons and transfer the absorbed photon energy to the activator ions.

Luminescent phosphor materials find widespread application in fluorescent lighting applications, where UV emission from mercury (Hg) gas is absorbed by the phosphor material and emitted as visible light. Other applications for such phosphor materials include the tuning of light emitted by light emitting diodes (LEDs). Such tuning can allow for the generation of white light using a single type of LED.

The conversion of a single ultraviolet (UV) photon into two visible (vis) photons with the result that the quantum efficiency of luminescence exceeds unity is termed quantum splitting. Quantum splitting materials are very desirable for use as phosphors for lighting applications, such as fluorescent lamps. A suitable quantum splitting phosphor can, in principle, produce a significantly brighter fluorescent light source due to higher overall luminous output because it can convert to visible light that part of the UV radiation that is not absorbed efficiently by traditional phosphors that are currently used in commercial fluorescent lamps. Quantum splitting has been demonstrated previously in fluoride- and oxide-based materials. A material comprising 0.1% $Pr^{3+}$ in a matrix of $YF_3$ has been shown to generate more than one visible photon for every absorbed UV photon when excited with radiation having a wavelength of 185 nm. The measured quantum efficiency of this material was 140%, and thus greatly exceeded unity. However, fluoride-based compounds do not have sufficient stability to permit their use as phosphors in fluorescent lamps because they are known to react with mercury vapor that is used in such lamps to provide the UV radiation. Such reaction can form materials that do not exhibit quantum splitting. In addition, producing fluoride-based materials presents a great practical challenge because it involves the use of large quantities of highly reactive and toxic fluorine-based materials.

Lumen maintenance in halophosphate phosphors has been improved by the addition of cadmium (Cd). However, the high toxicity associated with Cd-containing materials has led to legislation precluding the use of such phosphors. The maintenance and lamp efficacy of phosphors such as $Zn_2SiO_4$:$Mn^{2+}$ has been improved by coating with non-emitting, high stability, wide-band-gap materials, such as $Al_2O_3$ and $Y_2O_3$.

More recently, oxide-based quantum splitting phosphors have been developed that overcome the disadvantages of fluoride based materials in fluorescent lighting applications. See, for example, A. M. Srivastava et al., "Luminescence of $Pr^{3+}$ in $SrAl_{12}O_{19}$: Observation of two photon luminescence in oxide lattice," J. Luminescence, 1997, 71, pp. 285-290; and commonly-assigned U.S. Pat. Nos. 5,571,451 and 6,613,248. Such materials are generally aluminates or borates doped with $Pr^{3+}$. A particularly good quantum splitting phosphor material is a strontium magnesium aluminate activated with $Pr^{3+}$ and charge compensated with $Mg^{2+}$. This phosphor is abbreviated: $SrAl_{12}O_{19}$:Pr,Mg.

While the above-mentioned oxide-based quantum-splitting phosphors overcome many of the limitations of halide-based quantum splitting phosphors, they generally have particle sizes large enough to scatter 254 nanometer (nm) radiation and would thereby decrease the efficiency of fluorescent lamps in which they are used.

In light of the above, a phosphor material with reduced scattering, due to smaller crystallite size (e.g., nanocrystals) and thinner coatings, would be of great benefit, especially if it were a quantum splitting phosphor.

BRIEF DESCRIPTION OF THE INVENTION

Some embodiments of the present invention are directed toward nanocrystalline oxide-based phosphor materials, and methods for making same. Typically, such methods comprise a steric entrapment route for converting precursors into such phosphor material.

In some embodiments, the nanocrystalline oxide-based phosphor material is a material selected from the group consisting of self-activated luminescent material, impurity-activated (i.e., doped) luminescent materials, and combinations thereof.

In some embodiments, the nanocrystalline oxide-based phosphor material is a phosphor selected from the group consisting of quantum splitting phosphors, UV-emitting phosphors, visible-emitting phosphors, and combinations thereof.

In those embodiments where the nanocrystalline oxide-based phosphor materials are quantum splitting phosphors, such phosphor materials display a quantum efficiency that exceeds unity. As a result of this high efficiency, there is considerable application for such phosphors in fluorescent lighting.

In some or other embodiments, such nanocrystalline oxide based phosphor materials, by virtue of their nanocrystallinity, provide reduced scattering-leading to greater efficiency when used in fluorescent or other lighting applications. Other applications for such phosphor materials of the present invention, include, but are not limited to, their combination with light-emitting diode (LED) devices, where the phosphors serve to tune the emission of the LED.

Generally, methods of making nanocrystalline oxide-based phosphor material, in accordance with some embodiments of the present invention, comprise the steps of: (a) dissolving a suitable quantity of at least one precursor material in a solvent to form a solution, the precursor material being suitable for forming phosphor material; (b) adding templating agent to the solution in an amount sufficient to form a microemulsion of vesicles comprising precursor material; (c) adding a flocculating agent to the microemulsion to effect a flocculation of the vesicles; (d) isolating the vesicles; (e) heating the vesicles to drive off organic matter and form oxide precursor material; and (f) heating the oxide precursor material at a crystallizing temperature to form a nanocrystalline oxide-based phosphor material.

In some embodiments, crystallization and crystallite sizes of the material can be confirmed by a variety of techniques including, but not limited to, X-ray diffraction (XRD), transmission electron microscopy (TEM), and electron energy loss spectroscopy (EELS). In some embodiments, emission spectroscopy is used to confirm the optical properties of the material.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
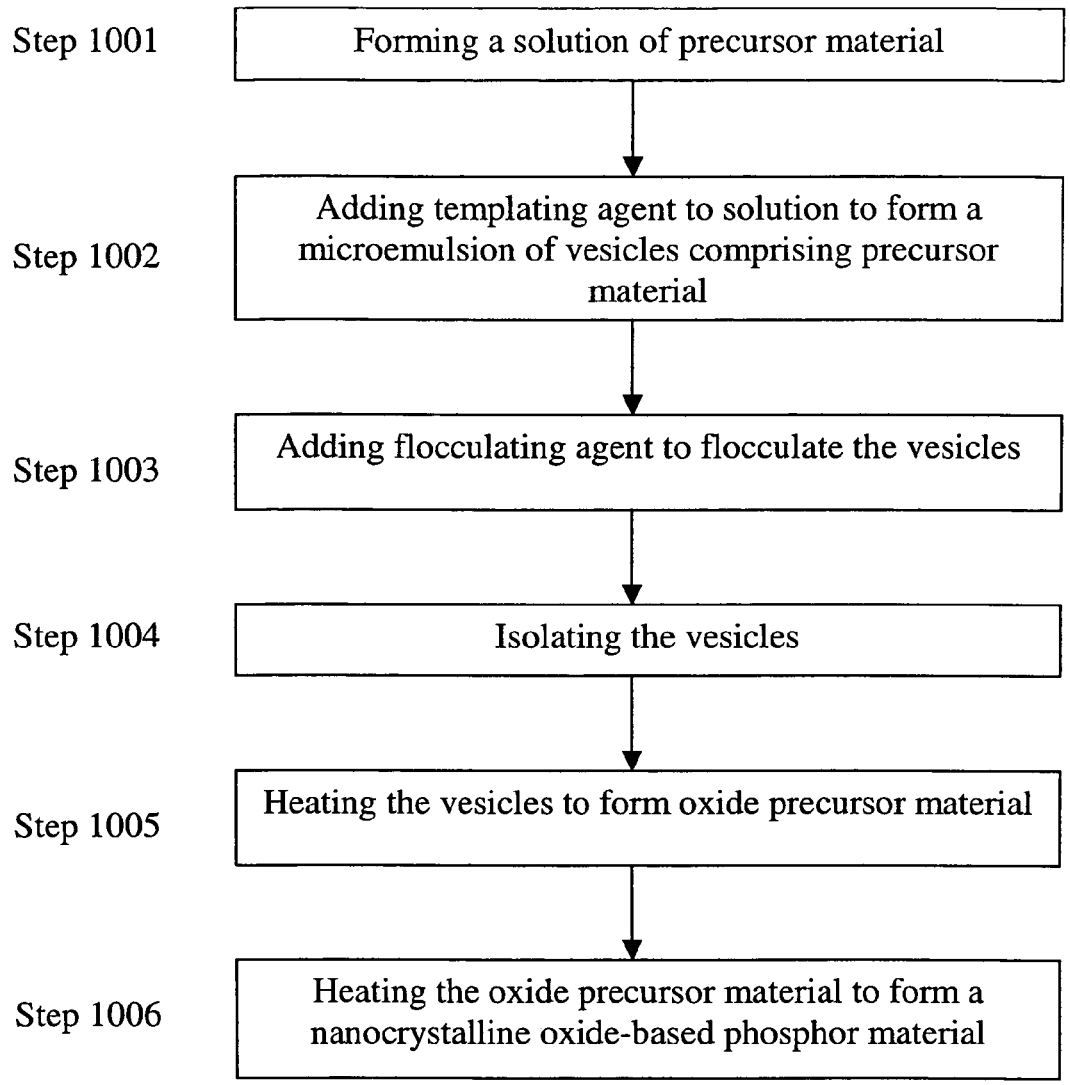
FIG. 1 is a flow diagram depicting a general method of making nanocrystalline oxide-based phosphor material in accordance with some embodiments of the present invention.

In the following description, specific details are set forth such as specific quantities, sizes, etc. so as to provide a thorough understanding of embodiments of the present invention. However, it will be obvious to those skilled in the art that the present invention may be practiced without such specific details. In many cases, details concerning such considerations and the like have been omitted inasmuch as such details are not necessary to obtain a complete understanding of the present invention and are within the skills of persons of ordinary skill in the relevant art.

Referring to the drawings in general, it will be understood that the illustrations are for the purpose of describing a particular embodiment of the invention and are not intended to limit the invention thereto.

While most of the terms used herein will be recognizable to those of skill in the art, the following definitions are nevertheless put forth to aid in the understanding of the present invention. It should be understood, however, that when not explicitly defined, terms should be interpreted as adopting a meaning presently accepted by those of skill in the art.

A "phosphor," as defined herein, is a luminescent material that absorbs electromagnetic (EM) radiation at one wavelength or wavelength range and emits radiation at another, generally lower energy, wavelength or wavelength range. Generally, phosphors are in the form of a powder or layer of fused powder. Such phosphors can be intrinsically luminescent, i.e., "self-activated phosphors," or they can be luminescent by the presence of dopant species within the bulk matrix, i.e., "impurity activated phosphors." Chemical formulae are used herein to represent materials in such a way that, whenever more two or more elements are included within a parenthesis, it implies that at least one of the elements need to be present in the material.

"Quantum splitting," as defined herein and in reference to phosphor material, refers to the emission of two photons for each photon absorbed. Phosphor materials displaying such quantum splitting behavior can, consequently, have exceedingly high luminescent efficiency. Such quantum splitting is also known in the art as "quantum cutting."

"Nanocrystalline," as defined herein, is a material attribute that generally refers to a material, such as a powder (loose or fused) or polycrystalline material and not necessarily having nanoscale dimensions itself, comprising primary crystallites generally having sizes below about 500 nm, typically below about 100 nm, and more typically below about 60 nm.

"Oxide-based," as defined herein and in reference to phosphor material, refers to a material in which the bulk matrix is largely of metal oxide composition.

A "microemulsion," as defined herein, is a suspension of micron or smaller sized quantities (particles) of material in a solvent, the material being in a solid or liquid state and having a surface energy sufficiently dissimilar to the solvent so as to be considered insoluble or immiscible. Typically, such microemulsions are formed and/or stabilized with an emulsifier (e.g., a surfactant). While many microemulsions are formed by dispersing a relatively non-polar species in water, polar species (e.g., water) can also be dispersed in a non-polar solvent. This latter scenario is known as a "reverse microemulsion." Similarly, a "colloid," or "colloidal suspension," is such a microemulsion, wherein the suspension does not scatter light. When a surfactant is used to stabilize a microemulsion or colloid, they generally do so by forming "micelles," spherical assemblies in which the surface energy of the exterior differs from that of the interior. In some cases, the microemulsion or colloid comprises only a solvent and a surfactant species that self-assembles into "vesicles."

Some embodiments of the present invention are directed toward nanocrystalline oxide-based phosphor materials, and methods for making same. Typically, such methods comprise a steric entrapment route for converting precursors into such phosphor material.

In some embodiments, the nanocrystalline oxide-based phosphor material is a material selected from the group consisting of self-activated luminescent material, impurity-activated luminescent materials, and combinations thereof.

In some embodiments, the nanocrystalline oxide-based phosphor material is a phosphor selected from the group consisting of quantum splitting phosphors, UV-emitting phosphors, visible-emitting phosphors, and combinations thereof.

Examples of quantum splitting nanocrystalline oxide-based phosphor material includes, but is not limited to, $LaB_3O_6:Pr^{3+}$; $(Gd,Y)B_3O_6:Pr^{3+}$; $(Sr,Ca)Al_{12}O_{19}:Pr^{3+}$; $(La,Gd,Y)MgB_5O_{10}:Pr^{3+}$; $SrB_4O_7:Pr^{3+}$; $CaMgAl_{11.33}O_{19}:Pr^{3+}$; $CaMgAl_{14}O_{23}:Pr^{3+}$; $LaB_3O_6:Pr^{3+},Pb^{2+}$; $(Gd,Y)B_3O_6:Pr^{3+},Pb^{2+}$; $(Sr,Ca)Al_{12}O_{19}:Pr^{3+},Pb^{2+}$; $(La,Gd,Y)MgB_5O_{10}:Pr^{3+},Pb^{2+}$; $SrB_4O_7:Pr^{3+},Pb^{2+}$; $CaMgAl_{11.33}O_{19}:Pr^{3+},Pb^{2+}$; $CaMgAl_{14}O_{23}:Pr^{3+},Pb^{2+}$; $LaB_3O_6:Pr^{3+},Pb^{2+},Bi^{3+}$; $(Gd,Y)B_3O_6:Pr^{3+},Pb^{2+},Bi^{3+}$; $(Sr,Ca)Al_{12}O_{19}:Pr^{3+},Pb^{2+},Bi^{3+}$; $(La,Gd,Y)MgB_5O_{10}:Pr^{3+},Pb^{2+},Bi^{3+}$; $SrB_4O_7:Pr^{3+},Pb^{2+},Bi^{3+}$; $CaMgAl_{11.33}O_{19}:Pr^{3+},Pb^{2+},Bi^{3+}$; $CaMgAl_{14}O_{23}:Pr^{3+},Pb^{2+},Bi^{3+}$; and combinations thereof, wherein such exemplary species are shown in a form bulk oxide:dopant(s).

Examples of UV-emitting nanocrystalline oxide-based phosphor material includes, but is not limited to, $LaPO_4:Pr^{3+}$; $LaBO_3:Pr^{3+}$; $YBO_3:Pr^{3+}$; $GdBO_3:Pr^{3+}$; $LuBO_3:Pr^{3+}$; $YPO_4:Pr^{3+}$; $GdPO_4:Pr^{3+}$; $Y_2SiO_5:Pr^{3+}$; $YPO_4:Bi^{3+}$; $LuPO_4:Bi^{3+}$; $LaPO_4:Pr^{3+},Pb^{2+}$; $LaBO_3:Pr^{3+},Pb^{2+}$; $YBO_3:Pr^{3+},Pb^{2+}$; $GdBO_3:Pr^{3+},Pb^{2+}$; $LuBO_3:Pr^{3+},Pb^{2+}$; $YPO_4:Pr^{3+},Pb^{2+}$; $GdPO_4:Pr^{3+},Pb^{2+}$; $Y_2SiO_5:Pr^{3+},Pb^{2+}$; $YPO_4:Bi^{3+},Pb^{2+}$; $LuPO_4:Bi^{3+},Pb^{2+}$; $LaPO_4:Pr^{3+},Pb^{2+},Bi^{3+}$; $LaBO_3:Pr^{3+},Pb^{2+},Bi^{3+}$; $YBO_3:Pr^{3+},Pb^{2+},Bi^{3+}$; $GdBO_3:Pr^{3+},Pb^{2+},Bi^{3+}$; $LuBO_3:Pr^{3+},Pb^{2+},Bi^{3+}$; $YPO_4:Pr^{3+},Pb^{2+},Bi^{3+}$; $GdPO_4:Pr^{3+},Pb^{2+},Bi^{3+}$; $Y_2SiO_5:Pr^{3+},Pb^{2+},Bi^{3+}$; $YPO_4:Pr^{3+},Bi^{3+},Pb^{2+}$; $LuPO_4:Pr^{3+},Bi^{3+},Pb^{2+}$;$(Ca,Mg,Sr)SO_4:Pb^{2+}$; $CaLi_2SiO_4:Pb^{2+}$; $(Ca,Ba,Sr)SiO_3:Pb^{2+}$; $Ba(Y,Gd,Lu)B_9O_{16}:Bi^{3+}$; $YOF:Bi^{3+}$; $(Gd,Y)OF:Bi^{3+},Pr^{3+}$; $(Y,Gd)_3Al_5O_{12}:Bi^{3+}$; and combinations thereof.

Examples of visible-emitting nanocrystalline oxide-based phosphor material includes, but is not limited to, $BaMg_2Al_{16}O_{27}:Eu^{2+}$; $CeMgAl_{11}O_{19}:Tb^{3+}$; $Y_2O_3:Eu^{3+}$;$(Ba,Sr,Ca)_5(PO_4)_3(Cl,F,OH):Eu^{2+}$; $(Ba,Sr,Ca)MgAl_{10}O_{17}:Eu^{2+}$; $(Ba,Sr,Ca)BPO_5:Eu^{2+}$; $Sr_4Al_{14}O_{25}:Eu^{2+}$; $BaAl_{18}O_{13}:Eu^{2+}$; $2SrO.0.84P_2O_5.0.16B_2O_3:Eu^{2+}$; $MgWO_4$; $BaTiP_2O_8$; $LaPO_4:Ce^{3+},Tb^{3+}$; $GdMgB_5O_{10}:(Ce^{3+},Tb^{3+},Mn^{2+})$; $GdMgB_5O_{10}:(Ce^{3+},Tb^{3+})$; $(Tb,Y,Lu,La,Gd)_3(Al,Ga)_5O_{12}:Ce^{3+}$; $(Ba,Sr,Ca)_5(PO_4)_3(Cl,F,OH):(Eu^{2+}, Mn^{2+},Sb^{3+})$; $(Y,Gd,La,Lu,Sc)_2O_3:Eu^{3+}$; $(Y,Gd,La,In,Lu,Sc)BO_3:Eu^{3+}$; $(Y,Gd,La)(Al,Ga)O_3:Eu^{3+}$; $(Ba,Sr,Ca)(Y,Gd,La,Lu)_2O_4:Eu^{3+}$; $(Y,Gd)Al_3B_4O_{12}:Eu^{3+}$; monoclinic $Gd_2O_3:Eu^{3+}$; $(Gd,Y)_4(Al,Ga)_2O_9:Eu^{3+}$; $(Ca,Sr)(Gd,Y)_3(Ge,Si)Al_3O_9:Eu^{3+}$; $GdMgB_5O_{10}:(Ce^{3+},Mn^{2+})$; $3.5MgO.0.5MgF_2.GeO_2:Mn^{4+}$; and combinations thereof.

In one particular embodiment, the nanocrystalline oxide-based phosphor material is a compound having the formula $Sr_{1-x}Pr_xAl_{12-x}Mg_xO_{19}$, where $0<X\leq0.20$. Such material is a known quantum splitting phosphor.

The nanocrystalline powder of oxide-based quantum splitting phosphor material comprises primary crystallites generally having diameters between about 5 nm and about 500 nm, typically between about 5 nm and about 100 nm, and more typically between about 5 nm and about 60 nm.

In embodiments where the nanocrystalline oxide-based phosphor materials are quantum splitting phosphors, such phosphor materials display a quantum efficiency that exceeds unity. As a result of this high efficiency, there is considerable application for such phosphors in fluorescent lighting.

In some embodiments, the present invention is directed toward oxide-based quantum splitting and vacuum ultraviolet (VUV)-converting phosphor compositions generally having crystallite sizes below about 100 nm in at least one particular dimension, typically below about 80 nm crystallite size in at least one particular dimension, and more typically below about 50 nm crystallite size in at least one particular dimension.

In some or other embodiments, such nanocrystalline oxide based phosphor materials, by virtue of their size, provide reduced scattering-leading to greater efficiency when used in fluorescent or other lighting applications. Other applications for such phosphor materials of the present invention, include, but are not limited to, their combination with light-emitting diode (LED) devices, wherein the phosphors serve to tune the emission of the LED.

Referring to FIG. 1, methods of making nanocrystalline oxide-based phosphor material, in accordance with some embodiments of the present invention, generally comprise the steps of: (Step 1001) dissolving a suitable quantity of at least one precursor material in a solvent to form a solution, the precursor material being suitable for forming phosphor material; (Step 1002) adding a templating agent to the solution in an amount sufficient to form a microemulsion of vesicles comprising precursor material; (Step 1003) adding a flocculating agent to the microemulsion to effect a flocculation of the vesicles; (Step 1004) isolating the vesicles; (Step 1005) heating the vesicles to drive off organic matter and form oxide precursor material; and (Step 1006) heating the oxide precursor material at a crystallizing temperature to form a nanocrystalline oxide-based phosphor material.

In some embodiments, the precursor material is selected so as to provide nanocrystalline powder of oxide-based phosphor material that absorbs in the 120 nm to 500 nm region of the electromagnetic spectrum and emits in the 220 nm to 750 nm region of the electromagnetic spectrum.

In some embodiments, the precursor material is selected from the group consisting of $Al(NO_3)_3.9H_2O$, $Pr(NO_3)_3.6H_2O$, $MgCl_2$, $Sr(NO_3)_2$ (anhydrous), $Mg(NO_3)_2.6H_2O$, $AlCl_3$ (anhydrous), $SrCl_2.6H_2O$, $PrCl_3.6H_2O$ and combinations thereof, so as to provide for a nanocrystalline powder of oxide-based quantum splitting phosphor material having the formula $Sr_{1-x}Pr_xAl_{12-x}Mg_xO_{19}$, where $0<X\leq0.20$.

Suitable solvents include, but are not limited to, water, ethanol, methanol, propanol, butanol, and combinations thereof. In some embodiments, the solvent mixture can include other less polar solvents, to modify/adapt polarity, such as acetic acid, formic acid, formamide, acetone, methylethylketone, ethylacetate, acetonitrile, N,N-dimethyl formamide, and dimethyl sulfoxide. Solvent selection is generally dependent upon precursor material and the templating agent(s) utilized during the processing. In some embodiments, where the solvent is water, additives and/or precursor materials render the solution (microemulsion of vesicles) acidic.

Typically, the precursor material(s) comprise one or more salt species. In certain embodiments, at least one precursor material comprises at least two salt species in suitable amounts. Such salt species can provide metal components via metal halides, phosphates, sulfates, etc. Salts such as phosphate, sulfate, or nitrate salts can also provide an oxide component. Many other salt combinations exist. In some embodiments, the stoichiometry of the phosphor product is established in step 1001 by ensuring that the precursor materials are added in suitable quantities.

Suitable templating agents, for use in Step 1002, include any species capable of assembling to form vesicles within the solvent so as to provide a microemulsion of vesicles. Generally, templating agents are selected from the group consisting of amphiphilic polymers, ionic surfactants, non-ionic surfactants, and combinations thereof. Suitable amphiphilic polymers include, but are not limited to, poly (vinyl alcohol). Suitable ionic surfactants include, but are not limited to, anionic surfactants such as sulfates, sulfonates, phosphates, and carboxylates; and cationic surfactants such as alkylammonium salts, gemini surfactants [S. K. Hait et al., "Gemini surfactants: A distinct class of self-assembling molecules," Current Science, 2002, 82, pp. 1101-1111], cethylpiperidinium salts, and bichain salts; and combinations thereof. Suitable non-ionic surfactants include, but are not limited to, polar non-ionic surfactants, non-polar non-ionic surfactants, and combinations thereof.

In some embodiments, the microemulsion is a reverse microemulsion. In some or other embodiments, the vesicles are micelles or reverse micelles.

Suitable flocculating agents, for use in Step 1003, include any species capable of destabilizing the microemulsion of vesicles. Exemplary flocculating agents include, but are not limited to, $NH_4OH$, NAOH, KOH, LiOH, tetramethylammonium hydroxide (TMAH), and combinations thereof.

Generally, isolating the vesicles (Step 1004) involves separating them from the bulk solvent. Suitable isolating techniques include, but are not limited to, evaporation, filtration, centrifugation, and combinations thereof. An isolating technique is suitable provided it allows precursor material to remain associated with it after the isolating technique is performed.

Heating the vesicles to form oxide precursor material (Step 1005) is generally done at a temperature between about 100° C. and about 800° C. Such heating serves to drive off organic matter and form a oxide precursor material. Some of the organics, if volatile, can be evaporated. Other organics are driven off as $CO_2$ by heating the vesicles in air (i.e., calcining).

Heating the oxide precursor material at a crystallizing temperature to form a nanocrystalline oxide-based phosphor material (Step 1006) is generally done at a temperature between about 200° C. and about 1400° C.

In some embodiments, an optional milling step is carried out prior to heating the oxide precursor material at a crystallizing temperature to form a nanocrystalline oxide-based phosphor material. In some such embodiments, such milling is done with refractory milling balls (e.g., $Al_2O_3$).

In some embodiments, sizes of the material can be confirmed by a variety of techniques including, but not limited to, X-ray diffraction (XRD), transmission electron microscopy (TEM), and electron energy loss spectroscopy (EELS). In some embodiments, emission spectroscopy is used to confirm the optical properties of the material.

In some embodiments, the present invention improves the light output and decreases lumen depreciation in fluorescent lamps by introducing a novel, nanocrystalline coated phosphor system. In particular, those lamps exposed to the 185 nm radiation of a mercury discharge can be most dramatically improved. A nanoscale coating of the phosphor particles that absorbs the 185 nm radiation, while transmitting 254 nm radiation of the mercury discharge, can simultaneously improve lumen maintenance as well as overall lamp efficiency. This occurs through emission by the nanoscale layer of either UV or visible radiation converted from the 185 nm input. Quantum splitting phosphors are ideal materials for this role, but phosphors which efficiently convert the 185 nm irradiation to radiation in the 250 nm range (where current phosphors absorb) can also improve overall lamp efficiency. However, new phosphor coatings must not scatter the incident 254 nm radiation, absorbed by the existing phosphor, in order to avoid lumen degradation.

As above, in some particular embodiments, the present invention is directed to methods for the preparation of the oxide based quantum splitting phosphors, the methods involving a templated synthesis which uses a polymer for steric entrapment of the oxide particles. Such steric entrapment methods provide particle size control by segregating the particles as they are formed in a subsequent pyrolysis process. After carefully evaporating water and calcination of organics, the resulting powders are heated to a variable set of temperatures and times required to form the desired quantum splitting oxide phase.

The processing routes of some embodiments of the present invention provide for the synthesis of nanocrystalline powders of oxide-based VUV-converting and quantum splitting phosphors. As discussed above, the quantum splitting phosphor can work as an active coating and will both absorb the 185 nm radiation as well as emit light at a wavelength suitable for either further excitation of the underlying phosphor layer or which increases the visible wavelength output of the lamp. Due to the nanoscale thickness of the coating, scattering of the 254 nm radiation can be avoided and lumen efficiency can be effectively increased. In some embodiments, the nanocrystalline phosphor material has a quantum efficiency exceeding 100%. In such embodiments $Pr^{3+}$ dopant within the material undergoes excitation corresponding to a 4f2-→4f5d electronic transition and undergoes emission corresponding to a relaxation to a $^1S_0$ electronic state.

The present invention, at least in some embodiments, provides low cost, reproducible, scalable processing of oxide based nanocrystalline quantum splitting phosphors and VUV-converting phosphors. The present invention, however, is not limited to an active nanoscale coating of quantum splitting composition. It will be appreciated by those of skill in the art that such methods can be used for a variety of other oxide based compositions.

In some embodiments, the phosphors described herein can be used in various lighting devices such as fluorescent lamps based upon Hg— or Xe— discharges, dielectric barrier discharge lamps, cold cathode compact fluorescent lamps, or light emitting diodes (organic or inorganic) using phosphor down-conversion. In addition, these phosphors could also be used in display applications using cathode ray excitation.

EXAMPLE

The following example is provided to demonstrate particular embodiments of the present invention. It should be appreciated by those of skill in the art that the methods disclosed in the example which follows merely represent exemplary embodiments of the present invention. However, those of skill in the art should, in light of the present disclosure, appreciate that many changes can be made in the specific embodiments described and still obtain a like or similar result without departing from the spirit and scope of the present invention.

Example 1

This Example serves to illustrate the preparation and characterization of an oxide-based quantum splitting phosphor material ($SrAl_{12}O_{19}$:Pr,Mg) in accordance with at least some embodiments of the present invention, wherein, after processing, X-ray diffraction (XRD) measurements verified that the method yielded nanocrystalline powders with crystallite sizes of ~50 nm. Optical characterization confirmed that the nanocrystalline powder exhibited a quantum splitting effect.

A 10 g batch of $SrAl_{12}O_{19}$:1% Pr,Mg was prepared using a steric entrapment route. Stoichiometric amounts of $Sr(NO_3)_2$, $Al(NO_3)_3 \cdot 9H_2O$, $Pr(NO_3)_3 \cdot 6H_2O$, and $MgCl_2$ were dissolved in 100 cm$^3$ of de-ionized water under constant stirring for 1 hour, followed by the subsequent addition of a 5 wt. % poly(vinylalcohol) (115,000 Mw) solution. The resulting mixed solution was precipitated by dropwise addition of 100 cm$^3$ of $NH_4OH$ (28-30%) solution. The resulting material was transferred to a porcelain tray and placed under an infrared heat lamp for 24 hours. The dried material was collected, transferred to an alumina crucible, and initially processed at 400° C. for 4 hours in the presence of air. The sample possessed macroscopic gray areas due to an incomplete decomposition of organic matter present in the sample. The sample was subsequently heated at 450° C., 500° C., and 550° C., for similar durations and under similar atmospheres. Since macroscopic inhomogeneities still persisted, the sample was removed and milled in isopropanol using high-density/high-purity $Al_2O_3$ grinding media for 6 hours, after which it was calcined at 600° C. for 4 hours in air. Upon completion of this step, the batch showed no visible grayness, and was completely white. Small aliquots were then removed and processed at 800° C., 1000° C., 1200° C., and 1400° C. for 4 hours in air in order to optimize phase formation. At each calcination step, a small aliquot of the sample was removed and characterized by powder X-ray diffraction.

Powder X-ray diffraction was carried out on selected samples using a Bruker D8 Advance X-ray diffractometer with Ni-filtered Cu—$K_\alpha$ radiation, and a scintillation detector with fixed slits of 1 mm, 1 mm, and 0.1 mm, for the aperture, scattered-radiation, and detector slits, respectively. The instrument was operated in θ-2θ geometry within the 30°-40° region, with a step size of 0.02 degrees, and a stepping rate of 1 step every 5 seconds. A NIST-certified 660a $LaB_6$ standard was used to determine the instrumental contributions to peak broadening. Average crystallite size was obtained using Scherrer's equation [see, e.g., B. D. Cullity, Elements of X-Ray Diffraction, Second Edition (Boston: Addison-Wesley, 1978), p. 102].

Figure 2:
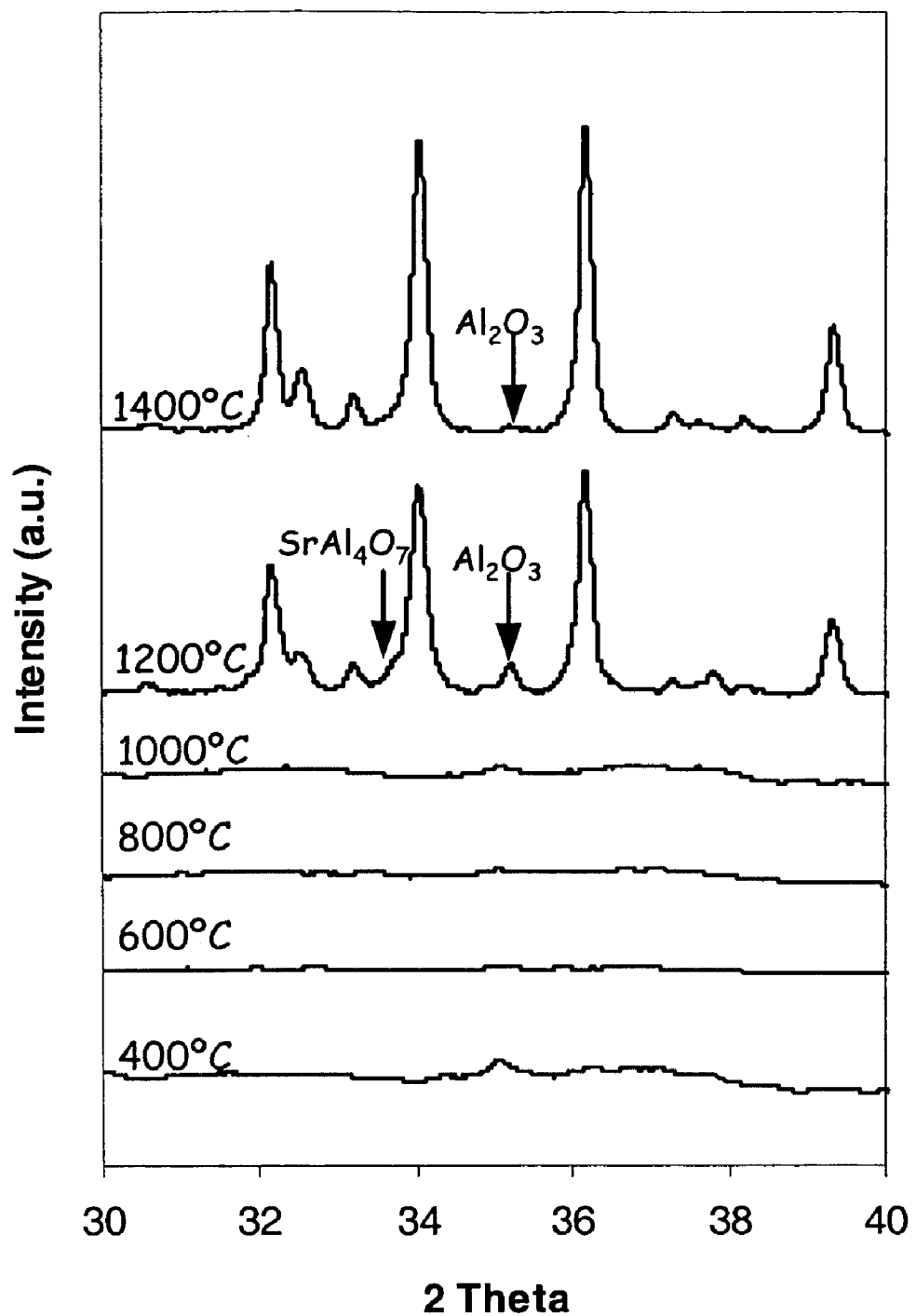
FIG. 2 depicts X-ray powder diffraction plots of $SrAl_{12}O_{19}$:1% Pr, Mg calcined at 400° C.-1400° C. in 200° C. intervals, where $SrAl_4O_7$, and $Al_2O_3$ impurities are indicated by arrows.

At temperatures up to around 1000° C., the X-ray powder diffraction shows mostly amorphous material, with vestigial amounts of nanosize $Al_2O_3$ and $SrCO_3$ (see FIG. 2). At 1200° C. the X-ray powder diffraction revealed that considerable reaction had occurred and reflections belonging to the desired $SrAl_2O_{19}$:1% Pr,Mg phase were detected with a crystallite size of 81 nm. A small amount of unreacted $SrAl_4O_7$, and $Al_2O_3$ (signaled by the arrows in FIG. 2) still remained in the sample. By increasing the temperature to 1400° C., the proportion of the $SrAl_{12}O_{19}$:1% Pr,Mg phase increased considerably, and a nearly phase-pure sample was obtained. The crystallite size increased only very slightly to 89 nm.

Figure 3:
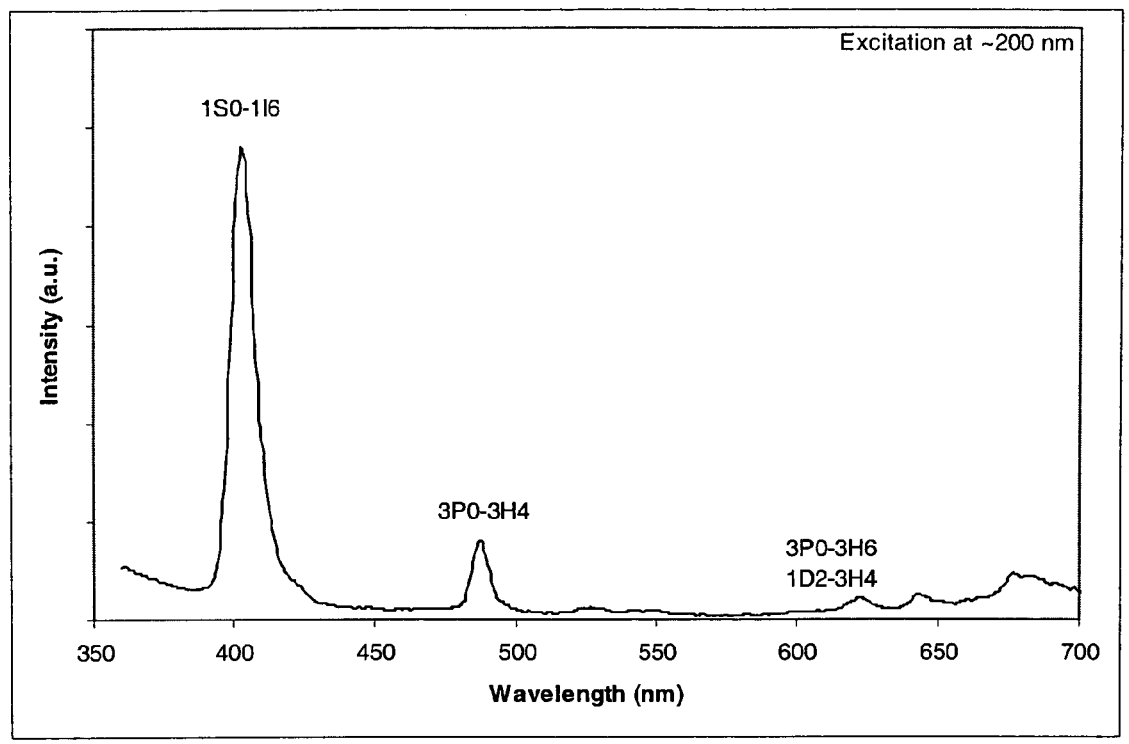
FIG. 3 depicts an emission spectrum obtained for a nanocrystalline oxide-based quantum splitting phosphor material, in accordance with embodiments of the present invention, revealing $Pr^{3+}$ $^1S_0$ emission under 200 nm excitation (4j2→4j5d), the critical signature for $Pr^{3+}$ quantum splitting.
Figure 4:
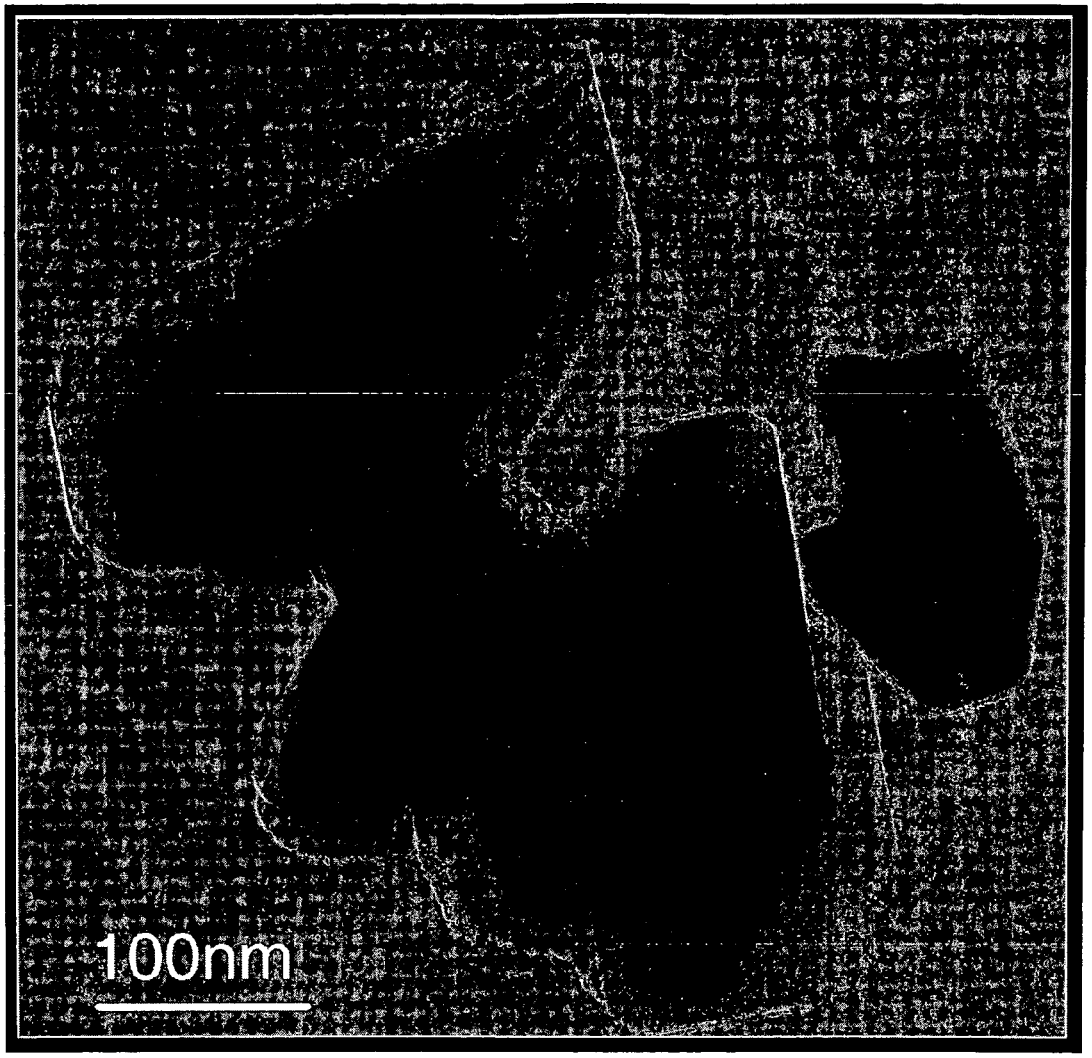
FIG. 4 is a TEM image of nanocrystalline oxide-based quantum splitting phosphor material, in accordance with embodiments of the present invention.
Figure 5:
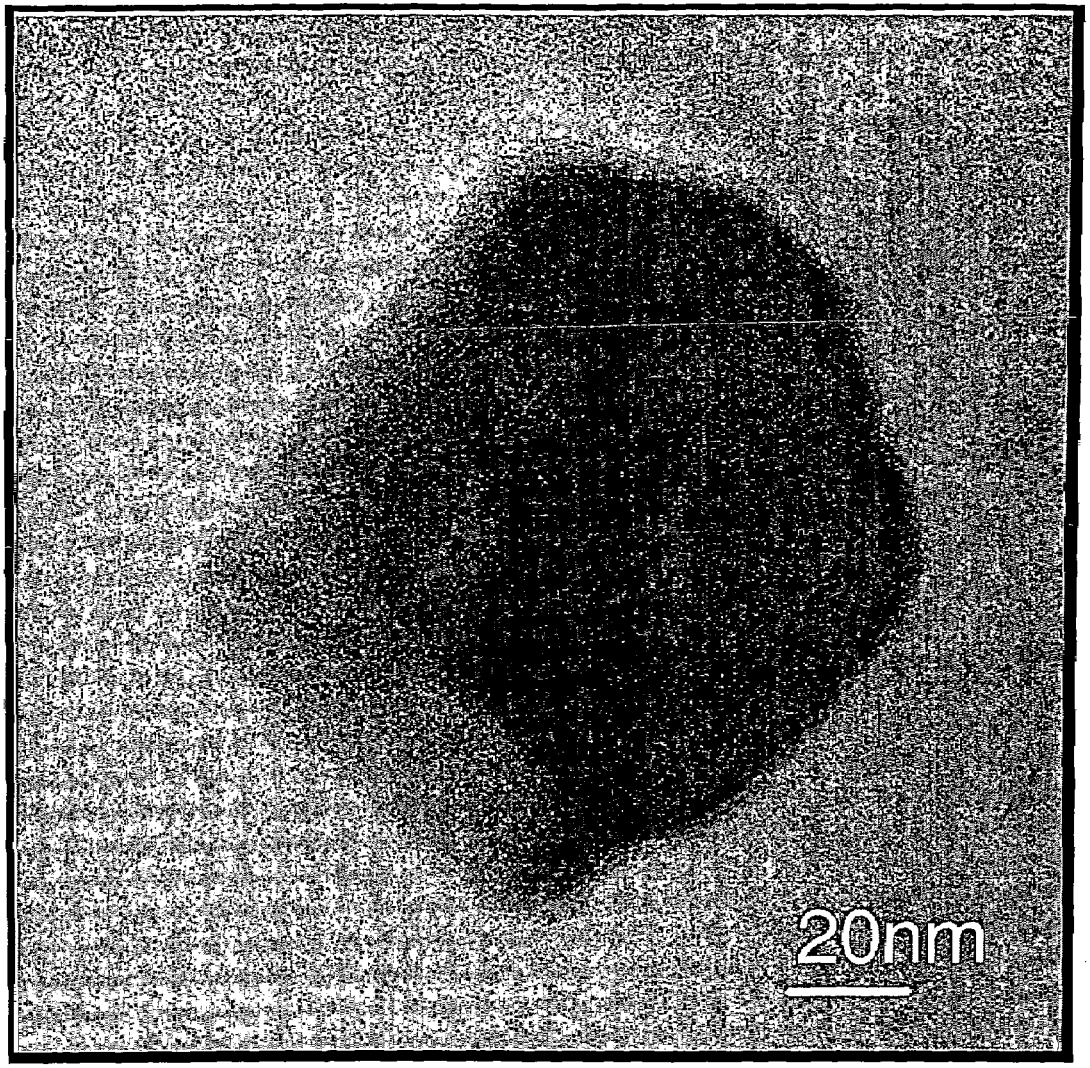
FIG. 5 is another TEM image of the nanocrystalline oxide-based quantum splitting phosphor material shown in FIG. 4, but acquired with higher magnification.

Emission spectra obtained for the material generated above revealed $Pr^{3+}$ $^1S_0$ emission under 200 nm excitation (4f2→4f5d), the critical signature for $Pr^{3+}$ quantum splitting (FIG. 3). Transmission electron microscopy (TEM) images of powders produced using the above-mentioned templating agent, and for which electron energy loss spectroscopy (EELS) measurements show thicknesses below 50 nm, are shown in FIGS. 4 and 5, wherein FIG. 5 depicts a more highly magnified region within FIG. 4.

Generally, embodiments of the present invention are directed toward nanocrystalline oxide-based phosphor materials, and methods for making same. Typically, such methods comprise a steric entrapment route for converting precursors into such phosphor material. In some embodiments, the nanocrystalline oxide-based phosphor materials are quantum splitting phosphors. In some or other embodiments, such nanocrystalline oxide based phosphor materials provide reduced scattering, leading to greater efficiency, when used in lighting applications.

It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method for making nanocrystalline oxide-based phosphor material comprising the steps of:
    a) dissolving a quantity of at least one precursor material in a solvent to form a solution, the precursor material being suitable for forming phosphor material;
    b) adding templating agent comprising poly(vinylalcohol) to the solution in an amount sufficient to form a microemulsion of vesicles comprising the precursor material;
    c) adding a flocculating agent to the microemulsion to effect a flocculation of the vesicles;
    d) isolating the vesicles;
    e) heating the vesicles to drive off organic matter and form an oxide precursor material; and
    f) heating the oxide precursor material at a crystallizing temperature to form a nanocrystalline oxide-based phosphor material.

2. The method of claim 1, wherein the at least one precursor material comprises at least one salt species.

3. The method of claim 1, wherein the at least one precursor material comprises at least two salt species in suitable amounts.

4. The method of claim 1, wherein the solvent is water.

5. The method of claim 1, wherein the microemulsion is a reverse microemulsion.

6. The method of claim 4, wherein the vesicles are micelles.

7. The method of claim 1, further comprising a step of milling the oxide precursor material prior to heating it at a crystallizing temperature.

8. The method of claim 4, wherein the microemulsion of vesicles is acidic.

9. The method of claim 8, wherein the flocculating agent is a base selected from the group consisting of $NH_4OH$, NaOH, KOH, LiOH, tetra methyl ammonium hydroxide (TMAH), and combinations thereof.

10. The method of claim 1, wherein isolating the vesicles involves a process selected from the group consisting of evaporation, filtration, centrifugation, and combinations thereof.

11. The method of claim 1, wherein heating the vesicles to drive off organic matter is carried out at a temperature between about 100° C. and about 800° C.

12. The method of claim 1, wherein the crystallizing temperature is between about 200° C. and about 1400° C.

13. The method of claim 1, wherein the nanocrystalline oxide-based phosphor material comprises crystallites with at least one dimension between about 5 nm and about 500 nm.

14. The method of claim 1, wherein the nanocrystalline oxide-based phosphor material comprises crystallites with at least one dimension between about 5 nm and about 100 nm.

15. The method of claim 1, wherein the nanocrystalline oxide-based phosphor material is a material selected from the group consisting of self-activated luminescent material, impurity-activated luminescent materials, and combinations thereof.

16. The method of claim 1, wherein the wherein the nanocrystalline oxide-based phosphor material is a phosphor selected from the group consisting of quantum splitting phosphors, UV-emitting phosphors, visible-emitting phosphors, and combinations thereof.

17. The method of claim 16, wherein the nanocrystalline oxide-based phosphor material is a doped oxide material, having a form bulk oxide:dopant, wherein the quantum splitting phosphor material is selected from the group consisting of $LaB_3O_6:Pr^{3+}$; $(Gd,Y)B_3O_6:Pr^{3+}$; $(Sr,Ca)Al_{12}O_{19}:Pr^{3+}$; $(La,Gd,Y)MgB_5O_{10}:Pr^{3+}$; $SrB_4O_7:Pr^{3+}$; $CaMgAl_{11.33}O_{19}:Pr^{3+}$; $CaMgAl_{14}O_{23}:Pr^{3+}$; $LaB_3O_6:Pr^{3+},Pb^{2+}$; $(Gd,Y)B_3O_6:Pr^{3+},Pb^{2+}$; $(Sr,Ca)Al_{12}O_{19}:Pr^{3+},Pb^{2+}$; $(La,Gd,Y)MgB_5O_{10}:Pr^{3+}$ $Pb^{2+}$; $SrB_4O_7:Pr^{3+},Pb^{2+}$; $CaMgAl_{11.33}O_{19}:Pr^{3+},Pb^{2+}$; $CaMgAl_{14}O_{23}:Pr^{3+},Pb^{2+}$; $LaB_3O_6:Pr^{3+},Pb^{2+},Bi^{3+}$; $(Gd,Y)B_3O_6:Pr^{3+},Pb^{2+},Bi^{3+}$; $(Sr,Ca)Al_{12}O_{19}:Pr^{3+},Pb^{2+},Bi^{3+}$; $(La,Gd,Y)MgB_5O_{10}:Pr^{3+},Pb^{2+},Bi^{3+}$; $SrB_4O_7:Pr^{3+},Pb^{2+},Bi^{3+}$; $CaMgAl_{11.33}O_{19}:Pr^{3+},Pb^{2+}$ $Bi^{3+}$; $CaMgAl_{14}O_{23}:Pr^{3+},Pb^{2+},Bi^{3+}$; and combinations thereof; the UV-mitting phosphor material is selected from the group consisting of $LaPO_4:Pr^{3+}$; $LaBO_3:Pr^{3+}$; $YBO_3:Pr^{3+}$; $GdBO_3:Pr^{3+}$; $LuBO_3:Pr^{3+}$; $YPO_4:Pr^{3+}$; $GdPO_4:Pr^{3+}$; $Y_2SiO_5:Pr^{3+}$; $YPO_4:Bi^{3+}$; $LuPO_4:Bi^{3+}$; $LaPO_4:Pr^{3+},Pb^{2+}$; $LaBO_3:Pr^{3+},Pb^{2+}$; $YBO_3:Pr^{3+},Pb^{2+}$; $GdBO_3:Pr^{3+},Pb^{2+}$; $LuBO_3:Pr^{3+},Pb^{2+}$; $YPO_4:Pr^{3+},Pb^{2+}$; $GdPO_4:Pr^{3+},Pb^{2+}$; $Y_2SiO_5:Pr^{3+},Pb^{2+}$; $YPO_4:Bi^{3+},Pb^{2+}$; $LuPO_4:Bi^{3+},Pb^{2+}$; $LaPO_4:Pr^{3+},Pb^{2+},Bi^{3+}$; $LaBO_3:Pr^{3+}$ $Pb^{2+},Bi^{3+}$; $YBO_3:Pr^{3+},Pb^{2+},Bi^{3+}$; $GdBO_3:Pr^{3+},Pb^{2+},Bi^{3+}$; $LuBO_3:Pr^{3+},Pb^{2+},Bi^{3+}$; $YPO_4:Pr^{3+},Pb^{2+},Bi^{3+}$; $GdPO_4:Pr^{3+},Pb^{2+},Bi^{3+}$; $Y_2SiO_5:Pr^+,Pb^{2+},Bi^{3+}$; $YPO_4:Pr^{3+},Bi^{3+},Pb^{2+}$; $LuPO_4:Pr^{3+},Bi^{3+},Pb^{2+}$; $(Ca,Mg,Sr)SO_4:Pb^{2+}$; $CaLi_2SiO_4:Pb^{2+}$; $(Ca,Ba,Sr)SiO_3:Pb^{2+}$; $Ba(Y,GdLu)B_9O_{16}:Bi^{3+}$; $YOF:Bi^{3+}$; $(Gd,Y)OF:Bi^{3+}$; $(Y,Gd)_3Al_5O_{12}:Bi^{3+}$; and combinations thereof; and the visible-emitting phosphor material is selected from the group consisting of $BaMg_2Al_{16}O_{27}:Eu^{2+}$; $CeMgAl_{11}O_{19}:Tb^{3+}$; $Y_2O_3:Eu^{3+}$; $(Ba,Sr,Ca)_5(PO_4)_3(Cl,F,OH):Eu^{2+}$; $(Ba,Sr,Ca)MgAl_{10}O_{17}:Eu^{2+}$; $(Ba,Sr,Ca)BPO_5:Eu^{2+}$; $Sr_4Al_{14}O_{25}:Eu^{2+}$; $BaA_{18}O_{13}:Eu^{2+}$; $2SrO.0.84P_2O_5.0.16B_2O_3:Eu^{2+}$; $MgWO_4$; $BaTiP_2O_8$; $LaPO_4:Ce^{3+},Tb^{3+}$; $GdMgB_5O_{10}:(Ce^{3+},Tb^{3+},Mn^{2+})$; $GdMgB_5O_{10}:(Ce^{3+},Tb^{3+})$; $(Tb,Y,Lu,La,Gd)_3(Al,Ga)_5O_{12}:Ce^{3+}$; $(Ba,Sr,Ca)_5(PO_4)_3(Cl,F,OH):(Eu^{2+},Mn^{2+},Sb^{3+})$; $(Y,Gd,La,Lu,Sc)_2O_3:Eu^{3+}$; $(Y,Gd,La,In,Lu,Sc)BO_3:Eu^{3+}$; $(Y,Gd,La)(Al,Ga)O_3:Eu^{3+}$; $(Ba,Sr,Ca)(Y,Gd,La,Lu)_2O_4:Eu^{3+}$; $(Y,Gd)Al_3B_4O_{12}:Eu^{3+}$; monoclinic $Gd_2O_3:Eu^{3+}$; $(Gd,Y)_4(Al,Ga)_2O_9:Eu^{3+}$; $(Ca,Sr)(Gd,Y)_3(Ge,Si)Al_3O_9:Eu^{3+}$; $GdMgB_5O_{10}:(Ce^{3+},Mn^{2+})$; $3.5MgO.0.5MgF_2.GeO_2:Mn^{4+}$; and combinations thereof.

18. The method of claim 1, wherein the nanocrystalline oxide-based phosphor material is a compound having the formula $Sr_{1-x}Pr_xAl_{12-x}Mg_xO_{19}$, where $0<x<0.20$.

19. The method of claim 18, wherein the at least one precursor material is selected from the group consisting of $Al(NO_3)_{3-9}H_2O$, $Pr(NO_3)_{3-6}H_2O$, $MgC_2$, $Sr(NO_3)_2$ (anhydrous), $Mg(NO_3)_{2-6}H_2O$, $AlCl_3$ (anhydrous), $SrCl_{2-6}H_2O$, $PrCl_{3-6}H_2O$, and combinations thereof.

20. The method of claim 1, wherein the precursor material is selected so as to provide nanocrystalline powder of oxide-based phosphor material that absorbs in the 120 nm to 500 nm region of the electromagnetic spectrum and emits in the 220 nm to 750 nm region of the electromagnetic spectrum.

21. A method for making nanocrystalline oxide-based phosphor material, the material having quantum splitting properties, comprising the steps of:
   a) dissolving a quantity of at least one precursor material in a solvent to form a solution, the precursor material being suitable for forming quantum splitting phosphor material;
   b) adding templating agent comprising poly(vinylalcohol) to the solution in an amount sufficient to form a microemulsion of vesicles comprising the precursor material;
   c) adding a flocculating agent to the microemulsion to effect a flocculation of the vesicles;
   d) isolating the vesicles;
   e) heating the vesicles to drive off organic matter and form an oxide precursor material; and
   f) heating the oxide precursor material at a crystallizing temperature to form a nanocrystalline powder of oxide-based quantum splitting phosphor material.

22. The method of claim 21, wherein the at least one precursor material comprises at least one salt species.

23. The method of claim 21, wherein the at least one precursor material comprises at least two salt species in suitable amounts.

24. The method of claim 21, wherein the solvent is water.

25. The method of claim 21, wherein the microemulsion is a reverse microemulsion.

26. The method of claim 24, wherein the vesicles are micelles.

27. The method of claim 21, further comprising a step of milling the oxide precursor material prior to heating it at a crystallizing temperature.

28. The method of claim 24, wherein the microemulsion of vesicles is acidic.

29. The method of claim 28, wherein the flocculating agent is a base selected from the group consisting of $NH_4OH$, NaOH, KOH, LiOH, tetra methyl ammonium hydroxide (TMAH), and combinations thereof.

30. The method of claim 21, wherein isolating the vesicles involves a process selected from the group consisting of evaporation, filtration, centrifugation, and combinations thereof.

31. The method of claim 21, wherein heating the vesicles to drive off organic matter is carried out at a temperature between about 100° C. and about 800° C.

32. The method of claim 21, wherein the crystallizing temperature is between about 200° C. and about 1400° C.

33. The method of claim 21, wherein the nanocrystalline powder of oxide-based quantum splitting phosphor material comprises crystallites having diameters between about 5 nm and about 500 nm.

34. The method of claim 21, wherein the nanocrystalline powder of oxide-based quantum splitting phosphor material comprises crystallites having diameters between about 5 nm and about 100 nm.

35. The method of claim 21, wherein the nanocrystalline powder of oxide-based quantum splitting phosphor material is selected from the group consisting of self-activated luminescent material, impurity-activated luminescent materials, and combinations thereof.

36. The method of claim 21, wherein the nanocrystalline powder of oxide-based quantum splitting phosphor material, having a form bulk oxide:dopant, is selected from the group consisting of $LaB_3O_6:Pr^{3+}$; $(Gd,Y)B_3O_6:Pr^+$; $(Sr,Ca)Al_{12}O_{19}:Pr^{3+}$; $(La,Gd,Y)MgB_5O_{10}:Pr^{3+}$; $SrB_4O_7:Pr^{3+}$; $CaMgAl_{11.33}O_{19}:Pr^{3+}$; $CaMgAl_{14}O_{23}:Pr^{3+}$; $LaB_3O_6:Pr^{3+},Pb^{2+}$; $(Gd,Y)B_3O_6:Pr^{3+},Pb^{2+}$; $(Sr,Ca)Al_{12}O_{19}:Pr^{3+},Pb^{2+}$; $(La,Gd,Y)MgB_5O_{10}:Pr^{3+}Pb^{2+}$; $SrB_4O_7:Pr^{3+},Pb^{2+}$; $CaMgAl_{11.33}O_{19}:Pr^{3+},Pb^{2+}$; $CaMgAl_{14}O_{23}:Pr^{3+},Pb^{2+}$; $LaB_3O_6:Pr^{3+},Pb^{2+},Bi^{3+}$; $(Gd,Y)B_3O_6:Pr^{3+},Pb^{2+},Bi^{3+}$; $(Sr,Ca)Al_{12}O_{19}:Pr^{3+},Pb^{2+},Bi^{3+}$; $(La,Gd,Y)MgB_5O_{10}:Pr^{3+},Pb^{2+}Bi^{3+}$; $SrB_4O_7:Pr^{3+},Pb^{2+},Bi^{3+}$; $CaMgAl_{11.33}O_{19}:Pr^{3+},Pb^{2+},Bi^{3+}$; $CaMgAl_{14}O_{23}:Pr^{3+},Pb^{2+},Bi^{3+}$.

37. The method of claim 21, wherein the nanocrystalline powder of oxide-based quantum splitting phosphor material is a compound having the formula $Sr_{1-x}Pr_xAl_{12-x}Mg_xO_{19}$, where $0<x<0.20$.

38. The method of claim 21, wherein the precursor material is selected so as to provide nanocrystalline powder of oxide-based quantum splitting phosphor material that absorbs in the 120 nm to 500 nm region of the electromagnetic spectrum and emits in the 220 nm to 750 nm region of the electromagnetic spectrum.

39. A method for making nanocrystalline oxide-based phosphor material comprising the steps of:
   a) dissolving a quantity of at least one precursor material in a solvent to form a solution, the precursor material being suitable for forming phosphor material;
   b) adding templating agent to the solution in an amount sufficient to form a microemulsion of vesicles comprising the precursor material, wherein the microemulsion of vesicles is acidic;
   c) adding a flocculating agent to the microemulsion to effect a flocculation of the vesicles;
   d) isolating the vesicles;
   e) heating the vesicles to drive off organic matter and form an oxide precursor material; and
   f) heating the oxide precursor material at a crystallizing temperature to form a nanocrystalline oxide-based phosphor material.

40. A method for making nanocrystalline oxide-based phosphor material, the material having quantum splitting properties, comprising the steps of:
   a) dissolving a quantity of at least one precursor material in a solvent to form a solution, the precursor material being suitable for forming quantum splitting phosphor material;
   b) adding templating agent to the solution in an amount sufficient to form a microemulsion of vesicles comprising the precursor material, wherein the microemulsion of vesicles is acidic;
   c) adding a flocculating agent to the microemulsion to effect a flocculation of the vesicles;
   d) isolating the vesicles;
   e) heating the vesicles to drive off organic matter and form an oxide precursor material; and
   f) heating the oxide precursor material at a crystallizing temperature to form a nanocrystalline powder of oxide-based quantum splitting phosphor material.

* * * * *

UNITED STATES PATENT AND TRADEMARK OFFICE
CERTIFICATE OF CORRECTION

PATENT NO. : 7,311,859 B1
APPLICATION NO. : 10/991980
DATED : December 25, 2007
INVENTOR(S) : Loureiro et al.

It is certified that error appears in the above-identified patent and that said Letters Patent is hereby corrected as shown below:

In Column 3, Line 66, delete "(4j2→4j5d)," and insert -- (4f2→4f5d), --, therefor.

In Column 7, Line 31, delete "cethylpiperidinium" and insert -- cethylbiperidinium --, therefor.

In Column 8, Line 48, delete "4f2-→4f5d" and insert -- 4f2→4f5d --, therefor.

In Column 11, Line 35, in Claim 16, after "claim 1," delete "wherein the".

In Column 11, Line 46, in Claim 17, delete "$CaMgA_{11.33}O_{19}:Pr^{3+}$;" and insert -- $CaMgAl_{11.33}O_{19}:Pr^{3+}$; --, therefor.

In Column 11, Line 54, in Claim 17, delete "UV-mitting" and insert -- UV-emitting --, therefor.

In Column 11, Line 66, in Claim 17, delete "Ba(Y,GdLu)" and insert -- Ba(Y,Gd,Lu) --, therefor.

In Column 11, Line 66, in Claim 17, delete "$(Gd,Y)OF:Bi^{3+}$" and insert -- $(Gd,Y)OF:Bi^{3+},Pr^{3+}$; --, therefor.

In Column 12, Line 17, in Claim 18, delete "$0<x<0.20$." and insert -- $0<x\leq0.20$. --, therefor.

In Column 12, Line 20, in Claim 19, delete "$Al(NO_3)_{3-9}H_2O$, $Pr(NO_3)_{3-6}H_2O$, $MgC_2$, $Sr(NO_3)_2$" and insert -- $Al(NO_3)_3.9H_2O$, $Pr(NO_3)_3.6H_2O$, $MgCl_2$, $Sr(NO_3)_2$ --, therefor.

In Column 12, Line 21, in Claim 19, delete "$Mg(NO_3)_{2-6}H_2O$," and insert -- $Mg(NO_3)_2.6H_2O$, --, therefor.

In Column 12, Lines 21-22, in Claim 19, delete "$SrCl_{2-6}H_2O$, $PrCl_{3-6}H_2O$," and insert -- $SrCl_2.6H_2O$, $PrCl_3.6H_2O$, --, therefor.

UNITED STATES PATENT AND TRADEMARK OFFICE
CERTIFICATE OF CORRECTION

PATENT NO. : 7,311,859 B1
APPLICATION NO. : 10/991980
DATED : December 25, 2007
INVENTOR(S) : Loureiro et al.

It is certified that error appears in the above-identified patent and that said Letters Patent is hereby corrected as shown below:

In Column 13, Line 39, in Claim 37, delete "$0<x<0.20.$" and insert -- $0<x\leq0.20.$ --, therefor.

Signed and Sealed this

First Day of July, 2008

JON W. DUDAS
*Director of the United States Patent and Trademark Office*